(12) United States Patent
Takefman

(10) Patent No.: US 7,733,807 B2
(45) Date of Patent: Jun. 8, 2010

(54) SYSTEMS AND METHODS FOR ACCELERATED LEARNING IN RING NETWORKS

(75) Inventor: Mike Takefman, Nepean (CA)

(73) Assignee: Cisco Technology, Inc., San Jose, CA (US)

( * ) Notice: Subject to any disclaimer, the term of this patent is extended or adjusted under 35 U.S.C. 154(b) by 843 days.

(21) Appl. No.: 11/221,339

(22) Filed: Sep. 6, 2005

(65) Prior Publication Data

US 2006/0098571 A1 May 11, 2006

Related U.S. Application Data

(60) Provisional application No. 60/626,246, filed on Nov. 9, 2004.

(51) Int. Cl.
*H04L 12/28* (2006.01)
(52) U.S. Cl. .................. 370/255; 370/402; 370/470
(58) Field of Classification Search .......... 370/401, 370/400, 389, 351, 466, 428
See application file for complete search history.

(56) References Cited

U.S. PATENT DOCUMENTS

| | | | | |
|---|---|---|---|---|
| 5,341,372 | A | 8/1994 | Kirkham | 370/85.8 |
| 6,651,106 | B1 | 11/2003 | Driscoll | 709/243 |
| 2002/0176371 | A1 | 11/2002 | Behzadi | |
| 2004/0170184 | A1* | 9/2004 | Hashimoto | 370/401 |
| 2006/0056425 | A1* | 3/2006 | Wu et al. | 370/401 |

OTHER PUBLICATIONS

Resilient Packet Ring (RPR), IEEE Draft P802.17/D3.3, Apr. 21, 2004, Copyright 4 by the Institute of Electrical and Electronics Engineers, Inc., emphasis on Annex F, pp. 623-642.
Amund Kvalbein, "Bridging in RPR Networks: Evaluation of an Enhanced Bridging Algorithm," May 1, 2003, pp. iii-100.
Marc Holness, "IEEE 802.17b: Spatially Aware Bridging Over RPR," IEEE 802.17 Resilient Packet Ring Working Group, Oct. 4, 2004, Ottawa, Canada, pp. 1-10.
Li Mo, et al., "Enhanced Bridging: Spatial Reuse of 802.17 Bridge Traffic," IEEE 802.17 Resilient Packet Ring Working Group, Jul. 9, 2002, Vancouver, Canada.
Nitan Gogate, "SAS Requirements," (first slide entitled "FNC Position") IEEE 802.17 Resilient Packet Ring Working Group, Oct. 4, 2004, Ottawa, Canada.
International Search Report as mailed from the PCT on Aug. 3, 2006, for counterpart WO Application (PCT/US2005/039590; Filed Oct. 31, 2005), 4 pages.

* cited by examiner

*Primary Examiner*—Kevin C Harper
*Assistant Examiner*—Henry Baron
(74) *Attorney, Agent, or Firm*—Campbell Stephenson LLP

(57) ABSTRACT

Systems, methods, devices and techniques can be used in networks including resilient packet ring networks and other types of ring topology networks to accelerate the learning of bridge/client mapping information. Once certain bridge/client mapping information is learned, and indicator can be set to cause subsequent transmissions to particular clients to be flooded to all stations on a ring network instead of being transmitted directly to the target station. Additionally, forced flooding can be triggered at regular or irregular intervals to further enhance the learning process.

21 Claims, 5 Drawing Sheets

FIG. 1 *(Prior Art)*

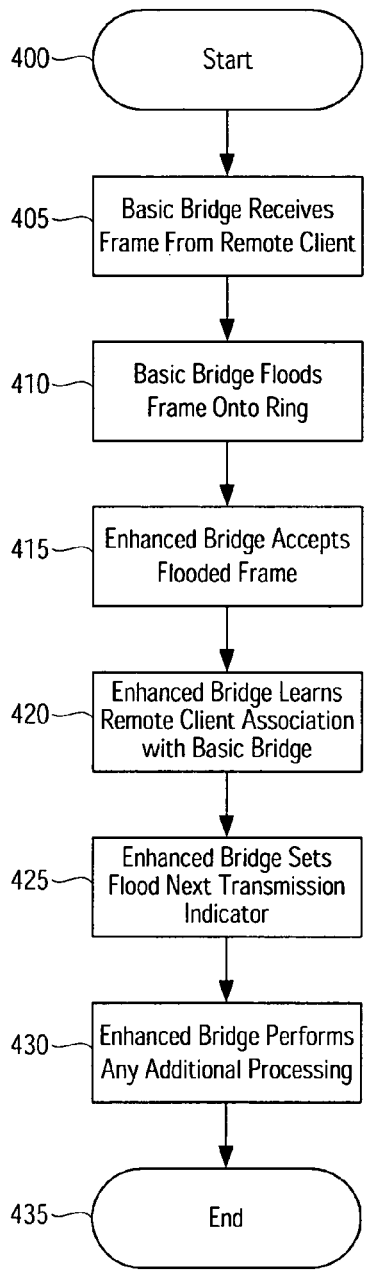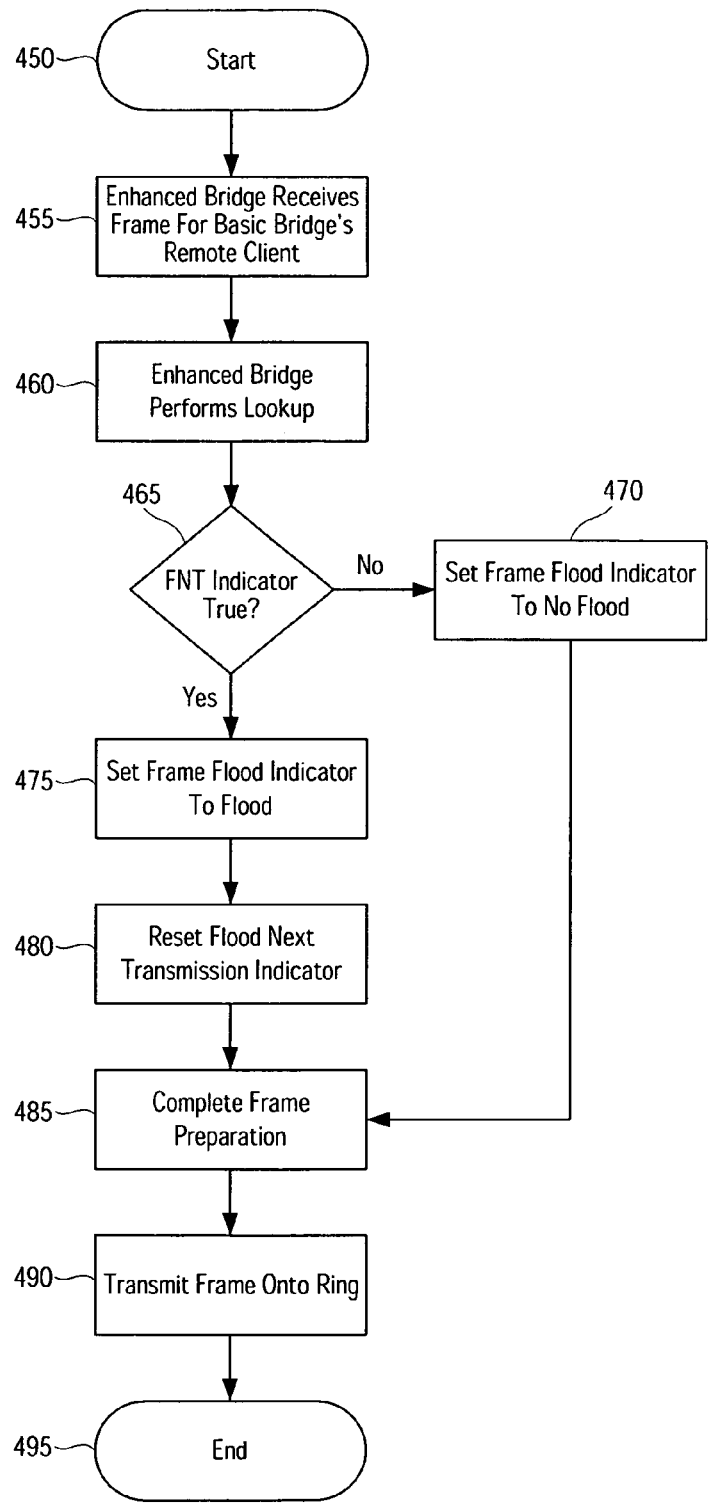
*FIG. 4A*   *FIG. 4B*

SYSTEMS AND METHODS FOR ACCELERATED LEARNING IN RING NETWORKS

This application claims the benefit, under 35 U.S.C. §119 (e), of U.S. Provisional Application No. 60/626,246, filed Nov. 9, 2004, entitled "Spatial Reuse Between Basic And Enhanced Stations In Bridged RPR Rings," and naming Mike Takefman as inventor. The above-referenced application is hereby incorporated by reference herein in its entirety.

FIELD OF THE INVENTION

The present invention relates to communications devices, and particularly data frame transfer over ring networks.

BACKGROUND OF THE INVENTION

An important trend in networking is the migration of packet-based technologies from local area networks (LANs) to metropolitan area networks (MANs). In the simplest terms, a MAN is a network that spans a metropolitan area. Generally, a MAN spans a larger geographic area than a LAN, but a smaller geographic area than a wide area network (WAN). The rapidly increasing volume of data traffic in MANs is challenging the capacity limits of existing transport infrastructures based on circuit-oriented technologies such as SONET, SDH, and ATM. Inefficiencies associated with carrying increasing quantities of data traffic over voice-optimized circuit-switched networks makes it difficult to provision new services and increases the cost of building additional capacity beyond the limits of most carriers' capital expense budgets. Packet based transport technology is considered by many to be one of the best alternatives for scaling metropolitan networks to meet the demand.

One leading packet based transport technology is Ethernet. Various different standard Ethernet interfaces operate at 10 Mbps, 100 Mbps, and 1 Gbps, and 10 Gbps, thus providing scalability of the service interface. Moreover, as nearly all Internet data packets begin and end as Ethernet frames, carrying data in a consistent packet format from start to finish throughout the entire transport path can eliminate the need for additional layers of protocol and synchronization that result in extra costs and complexities. In addition to efficient handling of IP packets, Ethernet has the advantages of familiarity, simplicity, and low cost. Although Ethernet is well suited for point-to-point and mesh network topologies, it can be difficult to deploy Ethernet in ring configurations and as a shared media. Ring network configurations act as a shared media and typically use media access control (MAC) mechanisms to manage access across multiple users. Ethernet, in contrast, has evolved to support full duplex switched infrastructures and lacks this type of MAC mechanism. However, much of the existing optical fiber network infrastructure in metro areas is in ring form, largely because incumbent transport technologies, e.g., SONET, are typically deployed over fiber rings. There are, therefore, great benefits in new technologies that can fully exploit fiber rings while retaining the inherent advantages of a packet-based transport mechanism like Ethernet.

A number of emerging technologies target metro data transport applications. Among these are the Dynamic Packet Transport/Spatial Reuse Protocol (DPT/SRP) and the IEEE 802.17 Resilient Packet Ring (RPR) standard. Dynamic Packet Transport is a resilient packet ring technology designed to deliver scalable Internet service, reliable IP-aware optical transport, and simplified network operations. DPT-based solutions allow service providers to cost effectively scale and distribute their Internet and IP services across a reliable optical packet ring infrastructure. DPT is based on SRP, which is a MAC-layer protocol developed by Cisco Systems for ring-based packet internetworking. The IEEE 802.17 RPR standard, offers several important features that have heretofore been exclusive to SONET: efficient support for ring topology and fast recovery from fiber cuts and link failures. RPR technology is expected to provide data efficiency, simplicity, and cost advantages that are typical to Ethernet. In addition, RPR technology solves problems such as fairness and congestion control that have not been addressed by incumbent technologies.

As outlined by the IEEE 802.17 RPR standard (the "standard"), the RPR layer model can be described in terms of the open systems interconnect (OSI) reference model familiar to those having ordinary skill in the art. A simplified block diagram showing the ring and station structure of an RPR implementation is shown in FIG. 1. A medium access control (MAC) control sublayer, a MAC datapath sublayer, and reconciliation sublayers are specified within the standard, as are the MAC service interface and PHY service interface supported by the sublayers. The MAC service interface provides service primitives used by MAC clients to transfer data with one or more peer clients on an RPR ring, or to transfer local control information between the MAC and MAC client. The MAC control sublayer controls the datapath sublayer, maintains the MAC state and coordination with the MAC control sublayer of other RPR MACs, and transfer of data between the MAC and its client. The MAC datapath layer provides data transfer functions for each ringlet. The PHY service interface is used by the MAC to transmit and receive frames on the physical media. Distinct reconciliation sublayers specify mapping between specific PHYs and the medium independent interface (MII).

Resilient packet ring system 100 includes a number of ring stations (station 0 130, station 1 140, station 2 150, ... and station N 160) interconnected by a ring structure utilizing unidirectional, counter-rotating ringlets. Each ringlet is made up of links between stations with data flow in the same direction. The ringlets are identified as ringlet0 110 and ringlet1 120. This standard allows a data frame to be transmitted on either of the two connected ringlets. For example, a unicast frame is inserted by a source station and copied by the destination station. For efficiency, the destination also strips the now irrelevant stale frame. The portion of a ring bounded by adjacent stations is called a span, and thus a span is composed of unidirectional links transmitting in opposite directions. The RPR dual-ring topology ensures that an alternate path between source station and destination station(s) is available following the failure of a single span or station. Fault response methods include pass-through and protection, as described in the standard.

One common network element is a bridge. In general, bridges are devices with two or more network interfaces, that forward data frames from one interface to one or more of the other interfaces. The RPR standard specifies a MAC bridging reference model compliant with IEEE Std 802.1D-2004 (or IEEE Std 802.1Q-2003) transparent bridges, where the RPR network acts as a shared broadcast medium. Traffic may originate or terminate at either local or remote end stations, and may be forwarded across an RPR network to other 802 networks by transparent bridges. Local end stations are end stations that directly attach to an RPR network, while remote end stations are end stations which originate and terminate LAN traffic forwarded across an RPR network via transparent bridges. RPR stations operating as transparent bridges forward traffic between an RPR network and their other associated LAN networks.

FIG. 2 illustrates an architectural model of an IEEE 802.1D compliant RPR bridge. Each port of a MAC bridge connects to a single network. As shown, bridge 200 includes bridge relay entity 230 that interconnects the bridge's ports, at least two ports (210 and 220), and higher layer entities 240, such as bridge management, bridge protocol management (e.g., spanning tree protocol management), and the like. Bridge relay entity 230 handles the MAC method independent functions of relaying frames between bridge ports, filtering frames, and learning filtering information (235). A filtering database (FDB) or table 237 supports relay operations. Bridge relay entity 230 also uses internal sublayer services provided by the separate MAC entities for each port. Each bridge port transmits and receives frames to and from the network to which it is attached. In the example of bridge 200, two ports are illustrated, one for an RPR network and one for a generic network (e.g., another RPR ring or various other Ethernet networks). Each port supports appropriate MAC dependent functions 215 and 225.

In RPR networks, frames are normally stripped at their destination, i.e., to provide spatial reuse. This strategy cannot generally be used for remote frames, since the source/destination node is not on the ring. The RPR standard (see, Annex F) accommodates this situation by implementing so-called basic bridging. In basic bridging, all remote frames are broadcast ("flooded") on the ring, so that they are seen by all bridges. In this way, RPR imitates a shared medium network, where all frames are visible to all nodes. However, this type of flooding prevents spatial reuse for remote traffic, and consequently consumes bandwidth resources. Efforts are currently underway as part of IEEE Project 802.17 to study proposals for an amendment to IEEE Standard 802.17-2004 that defines an addition to the 802.17 MAC to support spatially aware bridging. This amendment will be referred to as 802.17b, and will specify spatially aware or "enhanced" bridging.

While some bridges in RPR networks may include enhanced bridging functionality, it will still be desirable for those bridges to have the capability to interoperate with basic bridges. Accordingly, it is desirable to have mechanisms by which basic bridges can more efficiently be used with enhanced bridges. Moreover, it is desirable that such mechanisms operate, to the extent possible, within existing and emerging ring transmission schemes.

BRIEF DESCRIPTION OF THE DRAWINGS

A more complete understanding of the present invention and advantages thereof may be acquired by referring to the following description and the accompanying drawings, in which like reference numbers indicate like features.

FIGS. 4A-4B are flow charts illustrating network learning related techniques of the present invention.

DETAILED DESCRIPTION

The following sets forth a detailed description of at least the best contemplated mode for carrying out the one or more devices and/or processes described herein. As will also be apparent to one of skill in the art, the operations disclosed herein may be implemented in a number of ways, and such changes and modifications may be made without departing from this invention and its broader aspects. The description is intended to be illustrative and should not be taken to be limiting.

Figure 1:
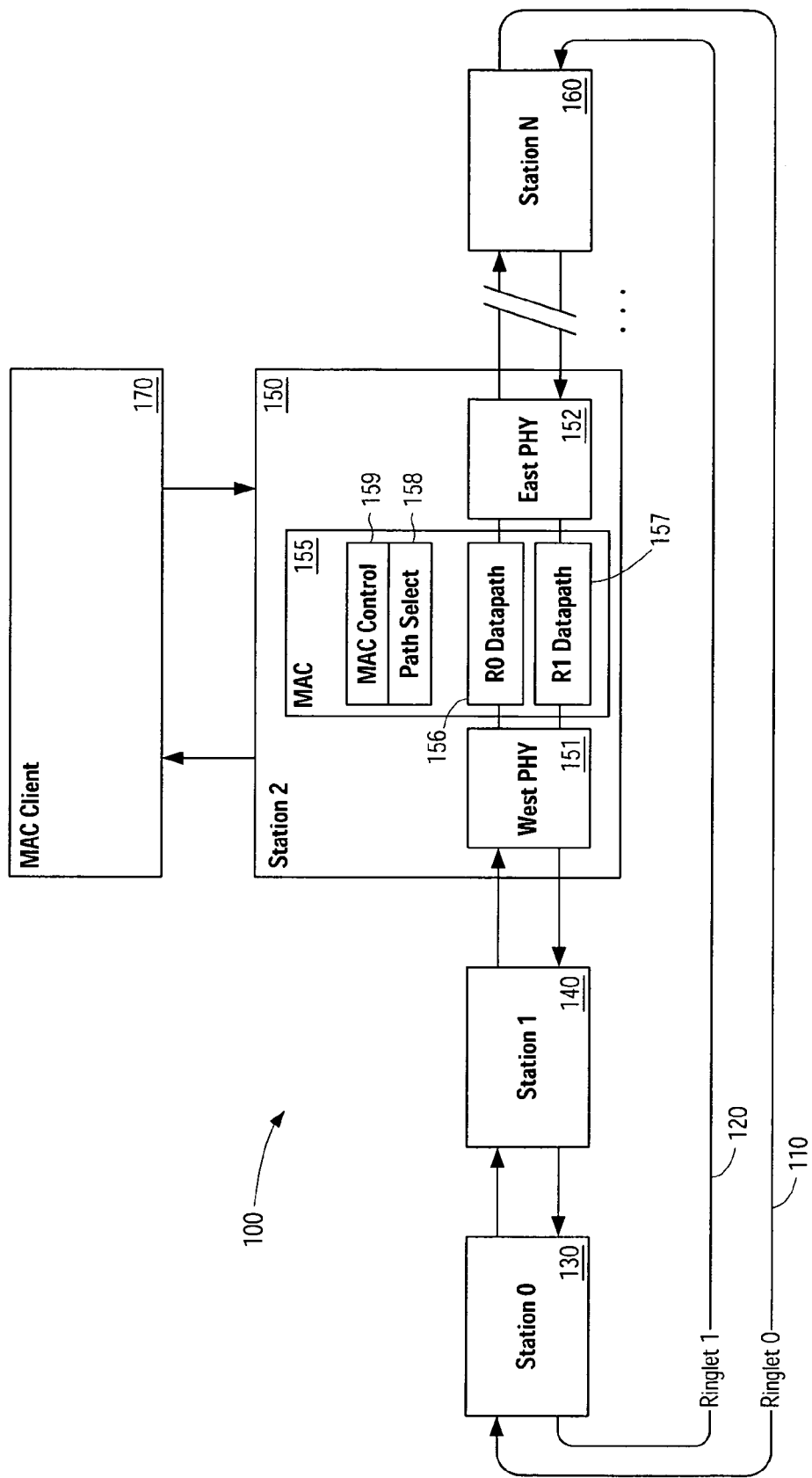
FIG. 1 illustrates a simplified block diagram of the ring and station structure of a resilient packet ring RPR network.

It will be noted that the variable identifier "N" is used in FIG. 1 to more simply designate the final element (e.g., station N 160) of a series of related or similar elements. The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "N" may hold the same or a different value than other instances of the same variable identifier.

Additionally, the systems, methods, devices, and techniques described in the present application will emphasize certain network communications concepts familiar to those having ordinary skill in the art. For example, a station as described herein can in general be any device attached to a network for the purpose of transmitting and/or receiving information on that network. Such stations typically include a media access control (MAC) device or entity, sometimes simply referred to as a "MAC", that is associated with the lower of the two sublayers of the data link layer defined by the IEEE and is responsible for, inter alia, managing protocol access to a physical network medium. A MAC device is typically implemented in hardware as one or more integrated circuits, e.g., ASICs, FPGAs, PLDs, microprocessors, microcontrollers, embedded processors, memory, etc., possibly in combination with software executing on the MAC device hardware. In general, a MAC client is a device or entity that invokes the service interface of a MAC device. Thus, a MAC client typically includes some combination of hardware and software that utilizes one or more MAC devices.

The systems, methods, apparatus and software of the present invention can be implemented in the context of network transport devices designed to be compliant with the IEEE 802.17 Resilient Packet Ring (RPR) standard (IEEE 802.17-2004), which is hereby incorporated by reference herein in its entirety. However, the systems, methods, apparatus and software of the present invention need not be limited to this version of the RPR standard or to RPR implementations. Thus, the systems, methods, apparatus and software of the present invention can be utilized in the context of emerging network standards and/or amendments thereto (e.g., IEEE 802.17b), as well as a variety of different networking structures and topologies.

In the present application, ring network nodes or stations are emphasized. Although much of the present discussion focuses on stations that are bridges, it will be understood by those having ordinary skill in the art that the presently disclosed devices and techniques can be implemented in a variety of different types of network devices, such as routers, switches, and bridges. In general, these devices are all tasked with forwarding of traffic between networks or segments of networks. Consequently, the various bridging techniques described in the present application may be implemented devices that might be considered routers, switches, bridges, or some combination thereof.

As noted above, the RPR standard specifies a MAC layer that offers spatial reuse via destination stripping of frames. However, the very nature of bridging suggests a broadcast media and the flooding of frames. In the context of a ring, being a broadcast media implies that all frames are seen by all stations, which is at odds with spatial reuse. The RPR standard specifies a special indication in the frame header, the flooding indication, that forces the packet to travel to every station on the ring and then be source stripped. More specifically, bridges on an RPR ring inspect the flooding indication in the frame header. If the flooding indication is set, the frame is copied and presented to the relay portion of the bridge. The relay then decides whether to forward the frame on some or all of its ports.

Figure 2:
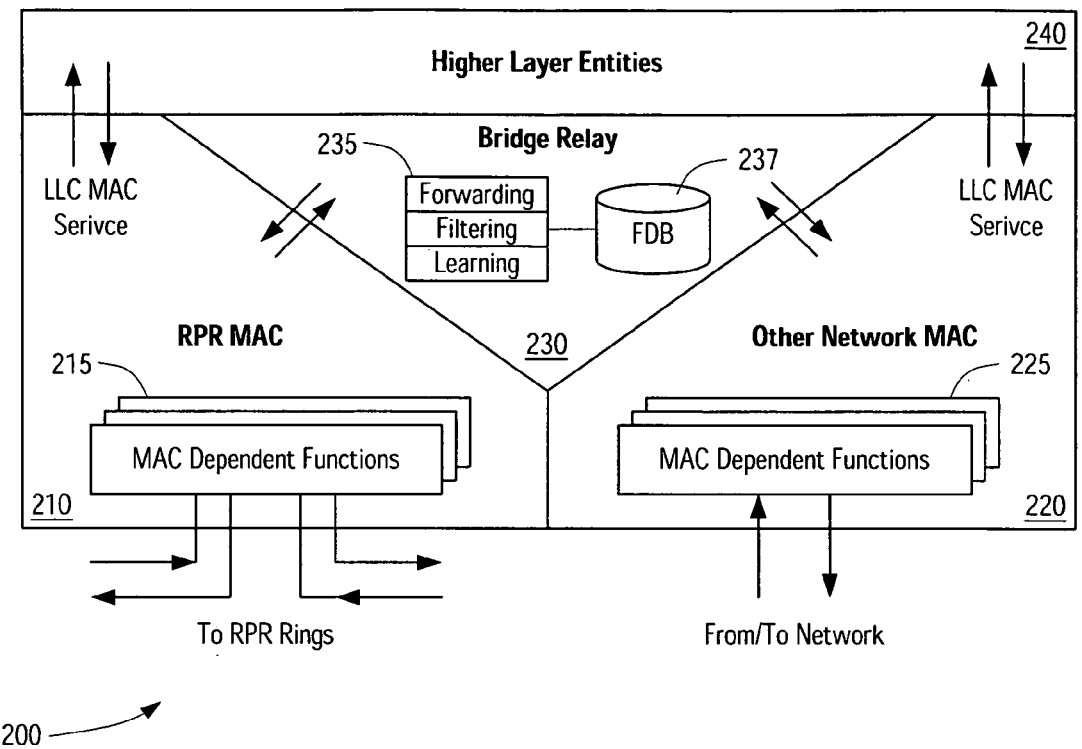
FIG. 2 illustrates a simplified block diagram of an IEEE 802.1D compliant RPR bridge that can also be modified to implement the techniques of the present invention.

Returning to FIG. 2, bridge 200 interconnects various networks, each having their own way to control access to the media. The different MAC protocols communicate with the bridge using the aforementioned internal sublayer services (ISS) interface. Frames are sent from a MAC through this interface to relay 230. The relay will then decide whether the frame should be forwarded, and forwards it on the correct port(s) using ISS interface(s). The learning, filtering, and forwarding processes (235) take place in relay 230, independent of the different MAC protocols used in the attached networks. The relay contains a filter database 237 with information on which nodes are attached to the different ports of the bridge. Filtering database 237 can include a mix of static and dynamic entries. Static entries are set by an administrator, while dynamic entries are governed by a learning process.

Flooding also occurs within a bridge itself, i.e., when a frame received on one port is replicated and transmitted on all other ports. Flooding within the bridge continues until the learning process builds up the filtering database, and the filter database is used to limit the scope of the flood. By inspecting the source addresses of the frames passing through relay 230, the learning process builds up an image of which nodes are reachable through the different ports. This information is used to make the bridge more efficient, by eventually only passing unicast frames to the network where the destination node is known to be. Thus, the flooding rules employed by an RPR basic bridge can be summarized as follows: (1) if the destination address (DA) of a frame is not a station on the ring, then the frame is flooded; (2) if the DA of the frame is a group address, the frame is flooded; and (3) if the source address (SA) of the frame is not that of the station transmitting the frame (i.e., the station is a bridge) the frame is flooded.

Although there are a variety of different ways to implement enhanced bridging, the common goal of the proposed implementations is to have bridges on a ring learn what hosts (addresses) are located behind each bridge on the ring. Spatial reuse can be achieved (at lease in some bridging cases) by letting end nodes address remote frames directly to the bridge that is responsible for forwarding traffic to the specific receiver. Enhanced bridging can be implemented as part of a centralized bridge engine within a device (e.g., as part of bridge relay 230), as an adjunct process above or below an RPR MAC, or as part of an RPR MAC itself. Thus, the additional learning that is performed can be part of the existing bridge learning processes (i.e., with information stored in a data structure such as filter database 237), or part of an additional learning process. In general, the presently disclosed techniques for improving the learning process can be implemented in any of these ways, and thus different implementations are discussed below.

Currently, the IEEE 802.17b working group plans to place enhanced bridging features in the RPR MAC in a so-called spatially aware sublayer (SAS). However, in other implementations, such spatially aware functionality can be placed anywhere in a system, e.g., above the RPR MAC. The requisite learning is performed in the spatially aware sublayer for each node, and a table or database is maintained that maps a remote address to a local (bridge) address. Such a map can include various other information such as detailed subport mapping and entry aging information. While this learning process is similar to the learning process already required of bridges, it is generally separate from that process. Bridge relays perform their learning of host-to-port mappings as described above, which enables them to decide which frames are to be forwarded on which ports. At the same time, learning of the mapping between remote end station addresses and local station addresses occurs in nodes supporting enhanced bridging.

For example, an SAS can associate a remote client MAC address, and optionally VLAN information, with the local (to the ring) MAC address of the RPR station providing an attachment interface. Thus, requests by MAC clients to transmit a frame over the ring are processed by the SAS (see, e.g., FIG. 5 discussed below). Upon receipt of such a frame, an SAS database is queried to determine if the destination address (and potentially VLAN identifier) has a corresponding RPR MAC address. If so, the frame is transmitted directly to that RPR station, and will be removed from the ring upon receipt. More specifically, the DA field within the RPR frame header is set to the identified RPR MAC address, and the flood indicator in the RPR frame header is set to the FI_NONE value (no flooding). If there is no database entry corresponding to the destination address, the frame is flooded over the ring. More specifically, the DA field within the RPR frame header is set to the RPR group address, and the flood indicator in the RPR frame header is set to either the FI_UNDIR (unidirectional flooding) value or FI_BIDIR (bidirectional flooding) value.

The learning process used by an SAS typically observes the source MAC address (and potentially VLAN identifier) of received frames along with the source RPR MAC address sourcing the client frame. SAS database entries are created dynamically if the source address field of the frame denotes a specific end station (i.e., is not a group MAC address), and (2) the resulting number of entries would not exceed the capacity of the filtering database, and (3) the destination address found in the RPR header field is the special RPR reserved group address, or (4) the destination address found in the RPR header is a unicast MAC address and the flooding indication field is set to FI_NONE. Additionally, various other database maintenance features can be implemented. For example, local/remote mappings can be routinely verified to confirm that there has been no change, local/remote mappings can be routinely re-written into the database without checking previous entries, entries can be aged out at specified or random intervals, entries can be cleared when a ring topology change is detected, etc. Various other features will be known to those having ordinary skill in the art.

Figure 3:
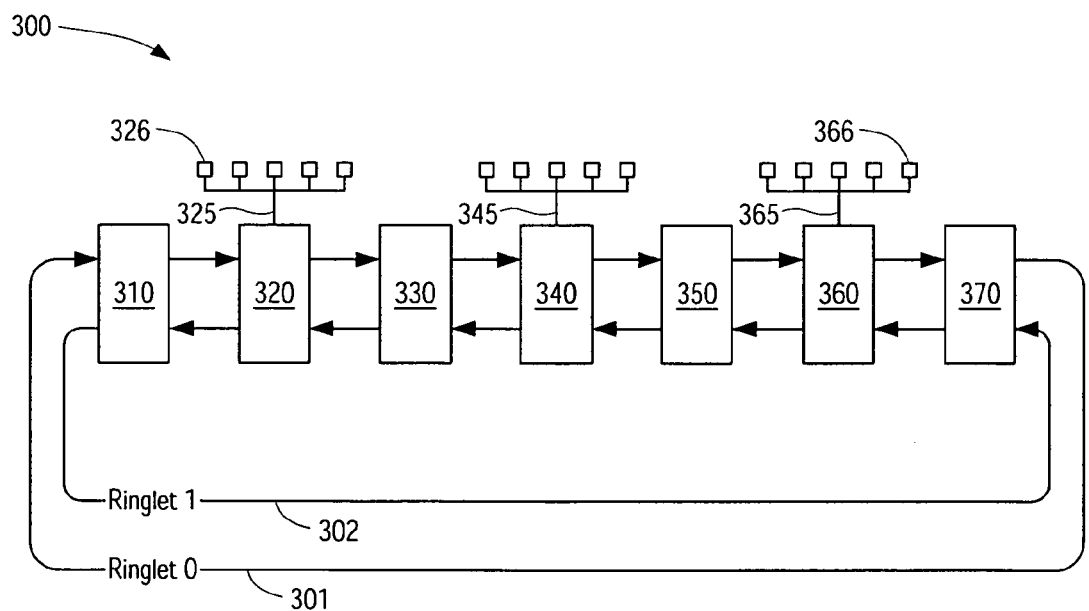
FIG. 3 illustrates a simplified block diagram of a ring network including several bridges.

When such enhanced bridges interoperate with basic bridges on an RPR ring, the SAS learning process can be hampered. Referring to FIG. 3, RPR network 300 includes various ring stations (310-370) interconnected by two ringlets (301 and 302). RPR network stations 320, 340, and 360 operate as bridges, and for the purpose of this example, stations 340 and 360 are implemented as enhanced bridges, while station 320 operates as a basic bridge. Associated with each bridge is a corresponding LAN (325, 345, and 365) with multiple nodes or remote clients. When remote client 326 on LAN 325 transmits a frame destined for remote client 366 on LAN 365, the frame is first received by basic bridge 320.

Because station 320 is operating as a basic bridge, the received frame is flooded onto the ring in keeping with the requirements for basic bridging per the RPR standard. Note that additional bridge relay or MAC logic can be used to determine whether flooding should be unidirectional or bidirectional. Enhanced bridges 340 and 360 (as well as all of the other stations on RPR network 300) receive the flooded frame. Because stations 340 and 360 are enhanced bridges, they have the opportunity to learn the remote client 326's association with basic bridge 320.

Once the location of remote client 326 (and/or other remote clients on LAN 325) is learned according to whatever enhanced bridging scheme is employed, e.g., the spatially aware sublayer, enhanced bridges 340 and 360 can directly transmit frames originating from their own remote clients. For example, when remote client 366 on LAN 365 transmits a frame destined for remote client 326 on LAN 325, the frame is first received by enhanced bridge 360. As the frame is handled by the bridge's SAS, a database lookup is performed, and station 360 determines that remote client 326 is associated with station 320. Station 360 can then direct the transmitted frame over the ring to station 320 via unicast target addressing, rather than via an undirected transmission using a flooding indicator. Note that in most ring bridging implementations, a frame can have two source and two destination addresses, i.e., one local and one remote for each of the source and destination.

In this manner, spatial reuse is achieved where transmission is from an enhanced bridge with knowledge of the bridge providing the attachment interface for the destination remote client. Moreover, the enhanced bridge can select the best ringlet for transmission (e.g., ringlet 0 301 because of the reduced hop count), further improving bandwidth utilization. However, this directed transmission from enhanced bridge 360 to basic bridge 320 means that other enhanced bridges on the ring (e.g., 340) may not learn as quickly about the remote clients behind enhanced bridge 360 (e.g., the nodes on LAN 365). For example, because enhanced bridge 360 does not have to flood frames destined for remote client 326 (because enhanced bridge 360 "knows" that remote client 326 is associated with basic bridge 320), there are no flooded frames having remote client 366 as the source address from which enhanced station 340 can learn. Of course, this does not mean that enhanced bridge 340 will never learn about enhanced bridge 360's remote clients; enhanced bridge 340 will learn as remote clients on LAN 365 transmit frames destined for nodes on LAN 345. However, the learning process can be hampered by the basic/enhanced bridge interaction.

FIGS. 4A and 4B illustrated several techniques that can be used to accelerate the learning process. FIG. 4A is a flow chart illustrating a first process that can be performed to establish the conditions for accelerated network learning. Operation begins at 400 where it is assumed that a ring network such as RPR network 300 is in operation and that the network includes at least one enhanced bridge and at least one basic bridge. In the discussion below, reference will be made to the network of FIG. 3, but it should be understood that network 300 is merely one example of the types of ring networks and ring network configurations in which the techniques of the present invention can be implemented.

In step 405, a basic bridge receives a frame from a remote client on a network supported by the bridge. For example, basic bridge 320 can receive a frame from remote client 326 of LAN 325. Because the frame is received by a basic bridge, the basic bridge floods the frame onto the ring (410). In the context of the RPR standard frame format, operation 320 can include a variety of steps to prepare the frame for transmission onto the ring. Those steps can include, for example, setting the frame header source address (SA) to the MAC address of the basic bridge, setting the frame header destination address (DA) to the destination MAC address specified by the remote client or a ring group address, setting the frame header extended source address (SAEXTENDED or ESA) to the MAC address of the remote client sourcing the frame, setting the frame header extended destination address (DAEXTENDED or EDA) to the destination MAC address specified by the remote client, and setting the flooding indicator (FI) to the appropriate flooding value. As will be understood by those having ordinary skill in the art, various other mapping and frame preparation operations can be performed, in accordance with the RPR standard, amendments to the RPR standard, or similar ring transmission protocols.

Once the frame is flooded onto the ring, it is eventually accepted by an enhanced bridge (415). Again, referring to FIG. 3, an example of an enhanced bridge is station 360. Typically, an enhanced bridge chooses to accept a frame based on the frames indicated destination address and/or the flooding indicator. In this example, because the frame is flooded onto the ring, the enhanced bridge will not strip the frame, but instead allow it to be transmitted to the next station along the appropriate ringlet. Next in step 420, the enhanced bridge learns the remote client association with the basic bridge. As noted above, logic to perform this operation can exist in a variety of different station entities (e.g., RPR MAC, bridge relay, etc.). Moreover, various steps can be included as part of the learning process, such as learning additional information, instantiating aging timers, storing the information in a table/database, and the like. In general, the particular manner in which enhanced bridging is implemented will suggest the various operations that can be performed as part of the learning process.

In addition to the normal learning process, an additional operation is performed at 425. Here, a specialized flood next transmission (FNT) indicator corresponding to the newly learned remote-client/basic-bridge mapping is set. This indicator is typically specific to the particular learned database entry, although in some embodiments a single flood next transmission indicator can be correspond to more than one mapping pair in the corresponding database. The flood next transmission indicator is set to a true value so that the next time the enhanced bridge finds the entry as part of its lookup process used for bridging traffic onto the ring (e.g., remote client 366 transmits a frame via enhanced bridge 360 to remote client 326, and enhanced bridge 360 finds the remote-client/basic-bridge mapping in its database) it can cause the frame to be flooded onto the ring instead of directly transmitted to the basic bridge. Thus, a deliberate choice is made to flood a frame that could have been directly transmitted, so that other enhanced bridges might more quickly learn about the remote-client/enhanced-bridge mapping of remote clients associated with the enhanced bridge. The flood next transmission indicator can be implemented in a variety of different ways, but will typically be implemented as one or more flags or bits, in much the same way as the flooding indicator is specified in the RPR standard. Any additional frame processing is handled in step 430 (e.g., retransmission, updating time-to-live information, stripping the frame if the enhanced station is the last station to receive the flooded frame, flooding the LAN coupled to the enhanced bridge, etc.), and the process terminates at 435.

The next component of the accelerated learning process, i.e., using the flood next transmission information, is illustrated in the flow chart of FIG. 4B. Operation begins at 450 where it is assumed that learning as described above has occurred, and the enhanced bridge in question has a SAS-type database that includes flood next transmission indicator information.

In 455, the enhanced bridge receives a frame from one of its remote clients, and that frame is destined for a remote client behind the basic bridge. Upon receipt of the frame, the enhanced bridge performs a lookup operation to determine whether it has SAS-type information about the destination remote client (360). In this example, it is assumed that that information does exist, i.e., the enhanced bridge discovers a remote-client/basic-bridge mapping in its database for the target remote client. Additionally, the enhanced station checks the value of the flood next transmission indicator. If, as determined in 465, the FNT indicator is not true, i.e., the enhanced station should not deliberately flood the frame onto the ring even though it has information adequate for direct transmission, the flood indicator for the RPR frame being formed is set to a "no flood" value (470), and operation transitions to 485, described below. In some embodiments, step 470 need not be explicitly performed because a default flooding condition is "no flood," and thus no change from the default condition needs to be made. If instead the FNT indicator has a true value, operation transitions to 475. Here, the flood indicator for the RPR frame being formed is set to a suitable flood value. Additionally, the flood next frame indicator is reset to a false value (480). This operation is performed because the preferential (if unnecessary) flooding need only occur once in many implementations. In other embodiments, the flood next transmission indicator could be a counter, allowing for a set number of preferential flooding operations, and counter decrementing is performed instead of resetting the indicator. Various other techniques associated with the flood next transmission indicator can be implemented.

In step 485, frame preparation is completed according to any other protocol requirements. The frame is flooded onto the ring (490), and operation terminates at 495. In still other embodiments, the flood next transmission indicator is used to force the flooding of frames merely for the purpose of teaching other enhanced bridges about the remote-clients associated with the enhanced bridge in question. Thus, instead of waiting for transmission of a frame from a remote client behind the enhanced bridge, specialized learning frames could be sent (immediately, at definite intervals, or at random intervals) based on information in the bridge entity filter database (e.g., FDB 237 in FIG. 2). Additionally, although the processes of FIGS. 4A and 4B are presented in the context of an SAS-like implementation, they could equally be employed in other enhanced bridging schemes, such as implementations where bridge/port mapping and remote-client/bridge mapping are integrated into a single process, entity, and/or database.

Figure 5:
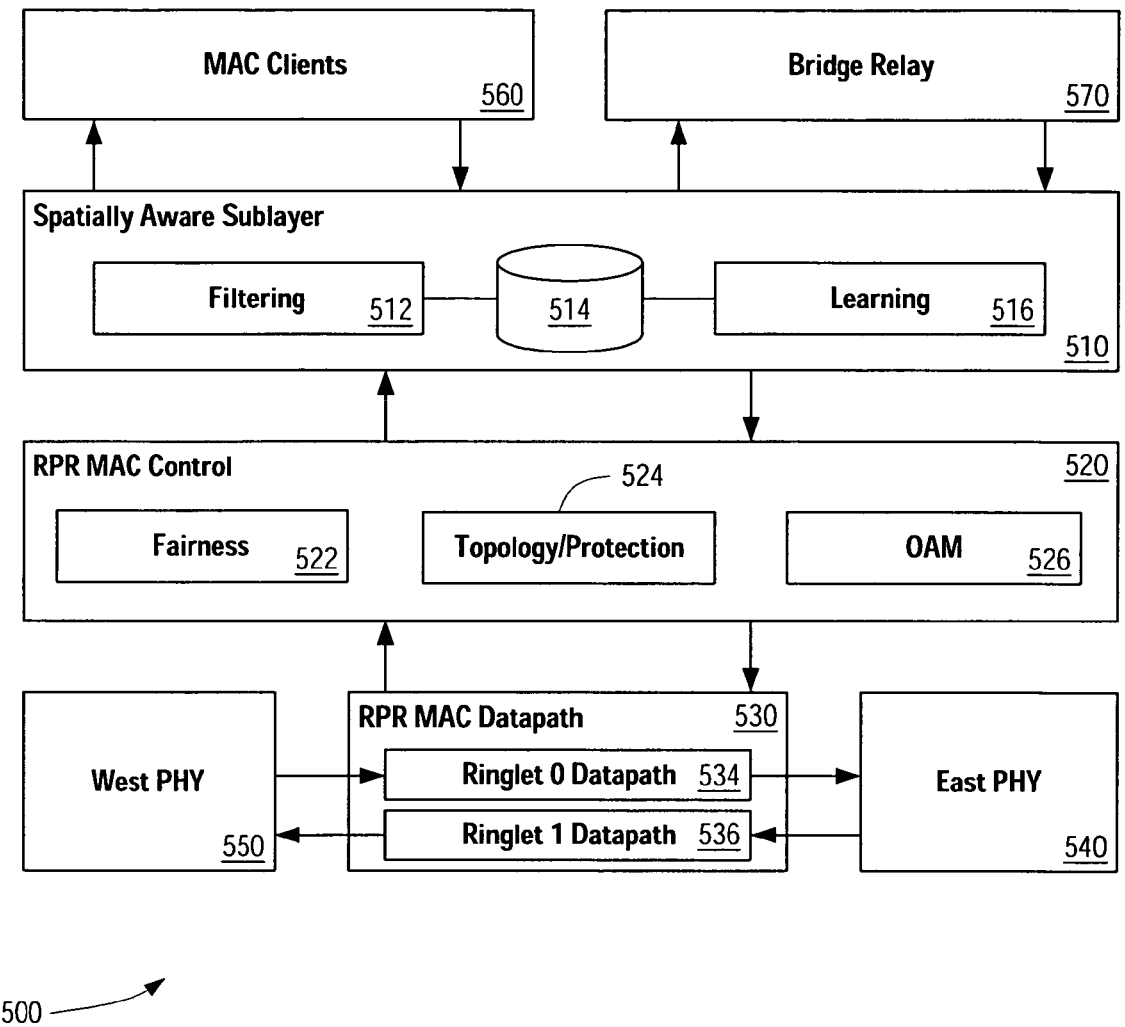
FIG. 5 illustrates a simplified block diagram of certain enhanced bridge components.

FIG. 5 illustrates a simplified block diagram of certain enhanced bridge components. In this example, enhanced bridge 500 includes a spatially aware sublayer 510 implemented as part of the station MAC or as a separate component from the station MAC. Other components of enhanced bridge 500 include RPR MAC control layer 520, RPR MAC datapath layer 530, physical layer service interfaces 540 and 550, MAC clients 560, and bridge relay 570. As will be understood to those having ordinary skill in the art, various other components can be included in enhanced bridge 500, and are simply omitted in this figure for clarity.

The basic operation of SAS 510 involves association of remote client addresses and optional accompanying VLAN identifiers with RPR station MACs that provides an attachment interface to the clients identified by the remote addresses. This association can be used to support directed transmissions over the ring when the requested client destination address is a remote address, thereby providing enhanced bridge functionality. In short, SAS 510 supports enhanced bridge operation and can include logic to implement the various processes disclosed in the present application. For example, learning module 516 can perform the learning operations needed to support enhanced bridging and the at least some of the added operations outlined above in connection with FIG. 4A, e.g., determining when to and setting the flood next transmission indictor. Learned information (including any associated data such as the flood next transmission indictor and entry aging information) is typically stored in SAS database 514. Enhanced bridging filtering operations, including some of the operations outlined above in connection with FIG. 4B, are handled by filtering logic 512.

RPR MAC control sublayer 520 provides various RPR functionality as outlined in the RPR standard. Illustrated are three significant types of RPR MAC control functionality, fairness module 522, topology & protection module 524, and operations, administration, and maintenance (OAM) module 526. Other examples of RPR MAC control functionality (not shown) include bandwidth allocation control, spatial reuse control, and frame ordering. For example, fairness logic 522 operates to alleviate possible congestion occurring when stations introduce too much data on to the ring. In general, a station that contributes to such congestion is not permitted to use more than its fair share of available capacity for the adding of fairness eligible traffic, and fairness logic 522 implements various fairness-based traffic shaping algorithms to restrict the use of available capacity (at least for eligible traffic) during periods of congestion.

Topology & protection module 524 provides various services related to discovering and maintaining the ring topology. For example, a topology discovery algorithm describes rules for the broadcast of topology information contained in topology and protection (TP) frames on the ring. These frames contain information about the originating station, and the configuration and capabilities making up the current topology image of that station. These frames are generated when the station becomes active on the ring, periodically, and on detection of a change in station or ring status. Protection services attempt to alleviate conditions threatening ring operation, such as station failure and network span failure. Protection generally involves either steering or wrapping traffic in order to limit service interruption.

OAM module 526 provides a set of control functions and indications to support configuration management, fault management, and performance management. Special control frames associated with OAM module 526 enable the detection and isolation of failures at the ring layer. These frames can be used either during service provisioning or continuously to minimize the correction time of abnormal operation.

RPR MAC datapath sublayer 530 provides the interaction between the client and the physical layer and communication between peer datapath sublayers in other MACs of the same ring. In particular, RPR MAC datapath sublayer 530 separately supports both ringlets, and therefore includes functionality for both (534 and 536). This sublayer can include various different types of logic, such as: frame reception logic (e.g., checking, counting, filtering, stripping, updating, and queuing frames), frame transit logic, and frame transmission logic (e.g., ringlet selection, queuing, service class shaping, and wrapping).

As noted above, enhanced bridging functionality including the techniques disclosed in the present application can be implemented in a variety of different ways, and enhanced bridge 500 is merely one example. Enhanced bridging functionality can be included as part of a centralized bridge engine within a device (e.g., as part of bridge relay 230 or 570), as an adjunct process above or below an RPR MAC, or as part of an RPR MAC itself.

For example, in implementations where normal bridge learning and filtering operations are combined with operations for performing accelerated learning, the bridge filtering database (e.g., FDB 237) is enhanced with extra information that is associated with each entry. Normally, FDB 237 contains a 60 bit (or larger) key that is made up of the 48-bit MAC address and a 12 bit VLAN identifier or tag. VLAN tags are normally not the 12 bits of VLAN information from a frame, but rather a value taken from an indirection table that is indexed using the frame's VLAN. The information stored in the data value associated with the key is the output bridge port where the station with the MAC address/VLAN can be found. Enhanced bridging augments that key with at least two extra pieces of data, a pointer (of some sort) to the station on the ring where the MAC address/VLAN can be found, and a state variable that can be used to control flooding on the output ring in order to accelerate ring learning, e.g., a flood next transmission indicator.

In order to keep the cost/power consumption of various lookup database/table implementations lower, hashing is an alternative to using content addressable memories (CAMs). To that end, the organizationally unique identifier (OUI) portion of a MAC address can be utilized. The OUI portion (22 bits) of a 48-bit MAC address is likely to come from a small set of OUIs. The remaining 24 bit extension identifier is assigned by the manufacturer. Many device manufacturers us only a small set of OUI values. For example, Cisco Systems, Inc., currently has approximately 228 OUI values from 00-00-0C to 00-E0-FC. Care is taken in selection of hash algorithms to insure that the resulting hash is not biased by a limited number of OUIs. Possible implementations include: (1) a single hash where the key is rearranged to spread the OUI value so that the bias is distributed; and (2) a 2-part hash where the OUI section is hashed and then merged with the hash of the extension.

Whether enhanced bridging functionality (and the enhanced learning process described herein) is integrated into bridge relay logic or is separately implemented in a spatially aware sublayer, the consistency of the values in the corresponding database is important for proper system operation. Thus, various database consistency check operations can be performed. Two possible consistency checks include checking whether each SA and ESA match, and that if a DA and EDA are not the same value, that the database is consistent with those values. In some implementations, it may be desirable to learn based on DA and/or EDA (rather than SA/ESA). Also, some embodiments may chose to purge or "unlearn" database entries when any issue regarding database consistency is discovered, e.g., to avoid stripping of frames in those cases. For example, when the DA, EDA, SA and ESA of a frame are known, but are not consistent between the database and the frame, the entry can be deleted from the database and the frame is treated as if it were flooded. Thus if a host moves, the effects are mitigated and the new topological aspects are learned as soon as possible. In many embodiments, it may simply be easier/safer, to overwrite database entries rather than performing a separate consistency or validation operation.

The truth table of Table 1 illustrates an example of the receive learning function of the MAC implement on frame reception from the media. Note that if an entry is verified then no change is needed to the database (FDB). If the verification fails, verification is not performed and an entry is simply overwritten, or the entry is not in the database, then the entry should be marked to flood the next transmission to that ESA.

TABLE 1

| Flood | DA | SA | EDA | ESA | FDB |
|---|---|---|---|---|---|
| 1 | != myDA | !=mySA | none | none | Nothing, SA already in topology |
| 1 | == myDA | != mySA | none | none | Nothing, SA already in topology |
| 1 | — | ==mySA | none | none | Nothing |
| 1 | != myDA | !=mySA | == DA | ESA | Verify ESA/SA & Learn |
| 1 | == myDA | != mySA | != DA | ESA | Verify ESA/SA & Learn |
| 1 | — | ==mySA | — | ESA | Nothing |
| 0 | !=myDA | !=mySA | none | none | Learn SA (technically already known) |
| 0 | ==myDA | !=mySA | none | none | Learn SA (technically already known) |
| 0 | — | ==mySA | — | ESA | Nothing |
| 0 | != myDA | !=mySA | == DA | ESA | Verify ESA/SA & Learn |
| 0 | == myDA | != mySA | != DA | ESA | Verify ESA/SA & Learn |
| 0 | — | ==mySA | — | ESA | Nothing |

Similarly, The receive path copy/strip functionality of the MAC can be implemented according to the following truth table (Table 2) on frame reception from the media. The FDB is searched for the DA and/or the EDA. Note also that in some multicast schemes, certain DA/EDA values might designate multicast frames. For example, a DA value not equal to "myDA," might be used to designate a multicast frame. Finally, in some embodiments certain described truth table entries for both Tables 1 and 2 need not be implemented.

TABLE 2

| Flood | DA | SA | EDA | ESA | Lookup |
|---|---|---|---|---|---|
| 1 | != myDA | !=mySA | none | none | Lookup(DA): If I own it, copy/strip else if someone else owns it transit else copy/transit |
| 1 | == myDA | != mySA | none | none | Illegal, but perform copy/transit |
| 1 | — | ==mySA | none | none | strip |
| 1 | != myDA | !=mySA | != DA | ESA | Lookup(EDA): If the entry does not match, copy/transit/delete_entry |
| 1 | == myDA | != mySA | != DA | ESA | Lookup(EDA): If I don't think I own it, copy/transit/delete entry |
| 1 | != myDA | !=mySA | == DA | ESA | Lookup(EDA): If I own it, copy/strip else if someone else owns it transit else copy/transit |
| 1 | == myDA | != mySA | == DA | ESA | copy/transit (it came from a bridge, so it had to have a good reason to flood) |
| 1 | — | ==mySA | — | ESA | strip |
| 0 | !=myDA | !=mySA | none | none | transit |
| 0 | ==myDA | !=mySA | none | none | copy/strip |
| 0 | — | ==mySA | none | none | strip |
| 0 | != myDA | !=mySA | != DA | ESA | Lookup(EDA) If the entry does not match, transit/delete_entry |
| 0 | != myDA | !=mySA | == DA | ESA | transit |
| 0 | == myDA | != mySA | != DA | ESA | If I don't think I own it, copy/transit/delete entry |

TABLE 2-continued

| Flood | DA | SA | EDA | ESA | Lookup |
|---|---|---|---|---|---|
| 0 | == myDA | != mySA | == DA | ESA | copy/strip |
| 0 | — | ==mySA | — | ESA | strip |

Figure 6:
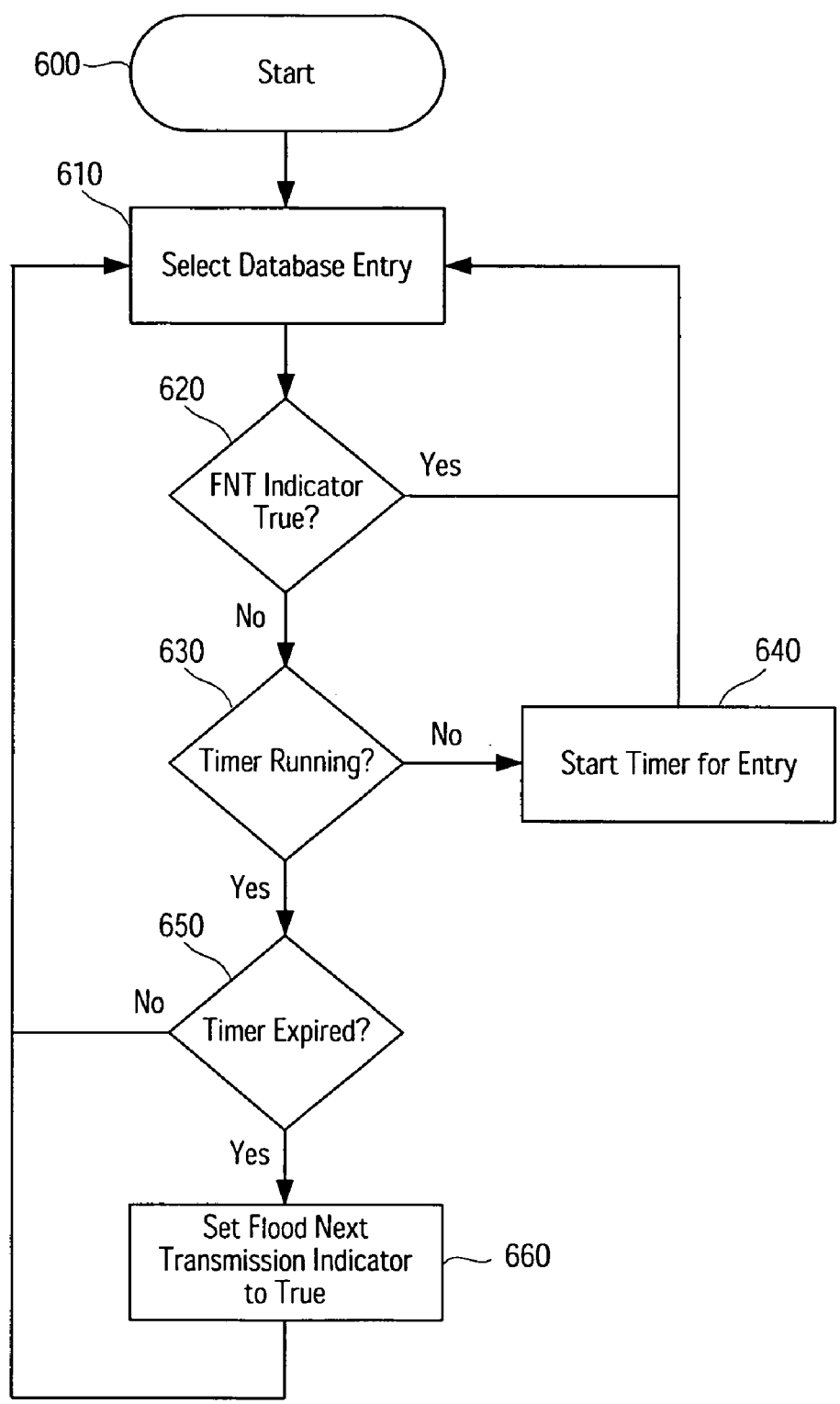
FIG. 6 is a flow chart illustrating additional network learning related techniques of the present invention.

Regardless of the implementation for enhanced bridging, higher resilience can be achieved forcing a small number of floods that insure that the databases on all ring stations are cleared and/or relearned. This added resilience might be particularly useful to address persistent flooding that can occur where an enhanced bridge is communicating with a basic bridge, and other enhanced bridges have (or will eventually) age out the entries associated with the enhanced bridge that is communicating with the basic bridge. FIG. 6 is a flow chart illustrating such additional network learning related techniques. Note that in the discussion of FIG. 6, reference will be made to the aforementioned filter next transmission indicator. Although this same indicator can be used for the additional purposes described below, a separate indicator can also be used.

Operation begins at 600 where it is assumed that a ring network such as RPR network 300 is in operation and that the network includes at least one enhanced bridge and at least one basic bridge. Moreover, the process illustrated operates on an existing SAS or FDB database, and it is assumed that the processes learning process places flood next transmission (FNT) indicators in the database using some techniques, e.g., as described above in connection with FIG. 4A. The process of FIG. 6 monitors database entries to determine if it is desirable to force a flooding situation.

In step 610, an entry is selected from the database. The entry typically includes a remote-client/bridge mapping pair and a flood next transmission indicator. If the value of the flood next transmission indicator is true, as determined in 620, then the next frame transmitted to the corresponding remote client will be flooded for the purposes of accelerated learning, and no additional steps need be taken. Consequently, operation returns to 610 where the next entry is selected and the process is repeated. In general, the process will cycle through all database entries and repeat according to a desired pattern encoded in the process logic.

If the value of the flood next transmission indicator is false, as determined in 620, operation transitions to 630 where a further determination is made. In this case, step 630 seeks to determine whether a timer corresponding to the selected database entry is running. The timer in question is used to decide whether the next transmission should be forced to flood. This timer could be an existing aging timer (used to periodically flush database entries) for the database entry, or a separate timer. In implementations where existing aging timers are reset after each re-learn operation, it is preferable to use a separate timer for the flood next transmission operation because it is unlikely that a conventional aging timer would ever have the opportunity to trigger a flood next transmission operation. Additionally, the timer could be implemented in a number of different ways. For example, the presence of a start time value in the database (or in an associated memory) can indicate that a timer is "running." In these implementations, the timer value may not be regularly updated like a stopwatch, but rather it will be periodically compared to the current time to determine if an elapsed time satisfies some condition or exceeds a threshold. In other implementations, the timer value is regularly updated. Still other implementations will be known to those having ordinary skill in the art. If there is no corresponding timer running, as determined in 630, the a timer is started in 640, and operation returns to 610 where the next entry is selected and the process is repeated.

If an entry timer is running, as determined in 630, operation transitions to 650 where expiration of the timer is tested. The manner in which expiration is determined will generally vary depending on the timer implementation. This is true both for the timer mechanism, and whether the timer is dedicated to this function or used for multiple functions. For example, in the case where an existing aging timer is used, expiration for the purposes of the process of FIG. 6 may be different from aging expiration, e.g., the test might not be whether the aging timer has expired, but rather whether some interval less than the aging interval has elapsed. Moreover, the intervals used to determine expiration can generally be set depending on other network factors such as: network size, regular aging interval used, size of the database, etc. In still other embodiments, different entries can have different expiration intervals for the process described in FIG. 6. If the timer has not expired, as determined in 650, operation returns to 610 where the next entry is selected and the process is repeated. If instead the timer has expired, operation transitions to 660 and the flood next transmission indicator is set to its true value. Operation then returns to 610.

The process of FIG. 6 generally repeats so that additional network learning can occur upon transmission to remote clients associated with basic bridges. Other variations of this process will be understood by those having ordinary skill in the art. For example, instead of selecting a single database entry for evaluation, a group of entries can be selected. If any one of the entries satisfies the desired criteria (e.g., about to be aged out, separate timer has expired, etc.), then the flood next transmission indicator can be set to the true value for all entries in the group. Similarly, the timer or timers used can correspond to multiple entries. In still other embodiments, the indicator set is not a flood next transmission indicator, but an indicator prompting more immediate flooding, such as the flooding of specialized learning frames.

The flow charts of FIGS. 4A, 4B, and 6 illustrate some of the many operational examples of accelerated learning processes disclosed in the present application. Those having ordinary skill in the art will readily recognize that certain steps or operations illustrated in FIGS. 4A, 4B, and 6 can be eliminated or taken in an alternate order. Moreover, the methods described throughout this application (including FIGS. 4A, 4B, and 6) are typically implemented as application specific integrated circuits, programmable logic devices, and/or as one or more software programs or microcode elements encoded in a computer readable medium as instructions executable on one or more processors, FPGAs, ASICs, or the like. The computer readable medium can be any one of an electronic storage medium, a magnetic storage medium, an optical storage medium, and a communications medium conveying signals encoding the instructions. Separate instances of these modules, logic entities, and programs can be executed on separate devices in keeping with the methods described above. Thus, although certain steps have been described as being performed by certain devices, software programs, processes, or entities, this need not be the case and a variety of alternative implementations will be understood by those having ordinary skill in the art.

In the most general sense, the networks and devices described herein transport data in the form of frames. A frame is a logical grouping of information sent as a data link layer unit over a transmission medium. Frames typically include header and/or trailer information, used for synchronization and error control, that surrounds user data contained in the unit. The terms cell, datagram, message, packet and segment are also used to describe logical information groupings at various layers of the OSI reference model and in various technology circles. As used herein, the term "frame" should be understood in its broadest sense, and can encompass other terms such as cell, datagram, message, packet and segment.

Although the present invention has been described with respect to a specific preferred embodiment thereof, various changes and modifications may be suggested to one skilled in the art and it is intended that the present invention encompass such changes and modifications that fall within the scope of the appended claims.

What is claimed is:

1. A method comprising:
  receiving at a first ring network station a frame that has been flooded onto a ring network by a second ring network station;
  learning information from the frame about at least one source associated with the frame;
  setting a flood next transmission indicator value associated with the information learned about the at least one source associated with the frame, wherein the flood next transmission indicator value indicates that a subsequent transmission to the at least one source associated with the frame should be flooded to the ring network; and
  subsequent to said setting the flood next transmission value,
    receiving at the first ring network station a second frame from a remote client coupled to the first ring network station through a second network,
    retrieving the flood next transmission indicator value associated with the information learned about the at least one source associated with the frame,
    causing a third frame to be flooded on the ring network, wherein the third frame comprises information from the second frame, and
    setting a second flood next transmission indicator value associated with the information learned about the at least one source associated with the frame, wherein the second flood next transmission indicator value indicates that a subsequent transmission to the at least one source associated with the frame should not be flooded to the ring network.

2. The method of claim 1 wherein the ring network is a resilient packet ring (RPR) network.

3. The method of claim 1 wherein the first ring network station is an enhanced bridge and the second ring network station is a basic bridge.

4. The method of claim 1 wherein the at least one source associated with the frame further comprises at least one of: the second ring station and a remote client coupled to the second ring station through a second network.

5. The method of claim 1 wherein the learning information from the frame further comprises:
  reading a first source address from the frame;
  reading a second source address from the frame; and
  associating the first source address with the second source address.

6. The method of claim 5 wherein the first source address corresponds to a MAC address of the second ring network station, and wherein the second source address corresponds to a MAC address of a remote client coupled to the second ring network station through a second network.

7. The method of claim 1 further comprising:
  recording an entry in a database, wherein the entry in the database includes the information from the frame about the at least one source associated with the frame and the flood next transmission indicator value.

8. The method of claim 1 wherein at least one destination address associated with the second frame is the at least one source associated with the frame.

9. The method of claim 1 wherein the retrieving the flood next transmission indicator value further comprises:
  searching a database using at least one destination address associated with the second frame.

10. The method of claim 1 wherein at least one of the learning and the setting the flood next transmission indicator value is performed by at least one of a spatially aware layer of the first ring network station and a bridge relay of the first ring network station.

11. The method of claim 1 encoded in a computer readable medium as instructions executable on a processor, the computer readable medium being one of an electronic storage medium, a magnetic storage medium, and an optical storage medium.

12. An apparatus comprising:
  a first media access control (MAC) device operable to be coupled to a ring network, the first MAC device including control logic configured to transmit and receive frames on the ring network;
  learning logic coupled to the first MAC device and configured to read at least one source address from a first received frame and write the at least one source address and an associated flood next transmission indicator value in a table, wherein the flood next transmission indicator value indicates that a subsequent transmission to the at least one source associated with the first received frame should be flooded to the ring network;
  a memory coupled to the learning logic, wherein the table is stored in the memory; and
  filtering logic coupled to the memory and configured to search the table based on a destination address for a second frame received by the MAC device subsequent to the first received frame, retrieve the flood next transmission indicator value, cause a third frame to be flooded on the ring network, and change the flood next transmission indicator value to a value indicating that a subsequent transmission to the at least one source associated with the first received frame should not be flooded to the ring network, wherein
  the third frame includes information from the second frame.

13. The apparatus of claim 12 wherein the ring network is a resilient packet ring (RPR) network.

14. The apparatus of claim 12 wherein the at least one source address from the received frame includes a first source address and a second source address, and wherein the learning logic is further configured to read the first source address and the second source address.

15. The apparatus of claim 14 wherein the first source address corresponds to a basic bridge coupled to the ring network and the second source address corresponds to a remote client coupled to the basic bridge through a second network.

16. The apparatus of claim 12 wherein the at least one source address from the received frame includes a first source address and a second source address, and wherein the table includes at least one entry, the at least one entry comprising the first source address, the second source address, and the flood next transmission indicator value.

17. The apparatus of claim 12 wherein at least one destination address associated with the second frame is the at least one source address from the first received frame.

18. The apparatus of claim 12 wherein the learning logic is part of a spatially aware layer of a ring network station.

19. The apparatus of claim 12 further comprising:
a bridge relay entity.

20. The apparatus of claim 19 wherein the learning logic is part of the bridge relay entity.

21. An apparatus comprising:
a first ring network station operable to be coupled to a ring network, the first ring network station including control logic configured to transmit and receive frames on the ring network;
a means for receiving at the first ring network station a frame that has been flooded onto the ring network by a second ring network station;
a means for learning information from the frame about at least one source associated with the frame; and
a means for setting a flood next transmission indicator value associated with information learned about the at least one source associated with the frame, wherein the flood next transmission indicator value indicates that a subsequent transmission to the at least one source associated with the frame should be flooded to the ring network; and means for receiving at the first ring network station, subsequent to setting the flood next transmission indicator value, a second frame from a remote client coupled to the first ring network station through a second network, means for retrieving, subsequent to receiving the second frame, the flood next transmission indicator value associated with the information learned about the at least one source associated with the frame, means for causing a third frame to be flooded on the ring network, wherein the third frame comprises information from the second frame, and means for setting, subsequent to said causing the third frame to be flooded, a second flood next transmission indicator value associated with the information learned about the at least one source associated with the frame, wherein the second flood next transmission indicator value indicates that a subsequent transmission to the at least one source associated with the frame should not be flooded to the ring network.

* * * * *